2,883,389

PIPERIDYL-4-HYDRAZINES

Ernst Jucker, Binningen, Basel-Land, Erwin Rissi, Basel, Rudolf Suess, Rheinfelden, Aargau, Arnold Vogel, Binningen, Basel-Land, and Eberhard Wolff, Riehen, near Basel, Switzerland, assignors to Sandoz A.G., Basel, Switzerland, a Swiss firm No Drawing. Application January 2, 1957
Serial No. 632,023

Claims priority, application Switzerland January 7, 1956

10 Claims. (Cl. 260—293.2)

The present invention relates to piperidyl-4-hydrazines and to the preparation thereof.

The new piperidyl-4-hydrazines of the present invention correspond to the formula

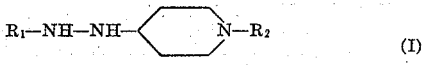
(I)

wherein $R_1$ stands for hydrogen, an alkyl group with 1 to 4 carbon atoms (e.g. methyl, ethyl, n-propyl, isopropyl, n-butyl, isobutyl, etc.) or an acyl group (e.g. acetyl, propionyl, butyryl, valeryl, caproyl, benzoyl, salicoyl, etc.), and $R_2$ stands for an alkyl group with 1 to 4 carbon atoms.

The said piperidyl-4-hydrazines (I) can be prepared in a number of ways.

Thus, for example, an N-alkyl-4-piperidone of the formula

(II)

wherein $R_2$ is as precedingly defined, can be condensed with an alkyl hydrazine of the formula $$R_1-NH-NH_2 \quad (III)$$

wherein $R_1$ is an alkyl group with 1 to 4 carbon atoms, to yield the corresponding N-alkyl-piperidyl-4-alkyl-hydrazone which, upon reduction, yields the corresponding ω-(N-alkyl-piperidyl-4)-ω'-alkyl-hydrazine.

Alternatively, the said N-alkyl-piperidone-4-alkyl-hydrazone may be acylated prior to the reduction, and the desired hydrazine derivative obtained by splitting off the acyl group, for example by saponification. In some cases, this alternative procedure enhances the yield of the desired product.

The condensation of an N-alkyl-4-piperidone with an acyl derivative of hydrazine itself produces the corresponding N-alkyl-4-piperidone-acyl-hydrazone derivative which, upon reduction, yields the corresponding hydrazine compound of Formula I, wherein $R_1$ is the acyl group. It is possible, if desired, to split off the acyl group to yield the corresponding hydrazine derivative, substituted on one side only. This is a preferred method of preparing such hydrazine derivatives, substituted on one side only, i.e. N-alkyl-piperidyl-4-hydrazines.

The new hydrazine derivatives I of the present invention can also be prepared by reacting an N-alkyl-4-halogen-piperidine of the formula

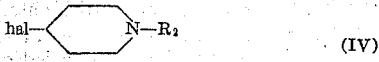
(IV)

wherein hal stands for chlorine or bromine, with a mono-alkyl-hydrazine or a mono-acyl-hydrazine. Where a mono-alkyl-hydrazine is employed, the product is a doubly-substituted hydrazine I; where a mono-acyl-hydrazine is employed, the product is an acylated hydrazine of Formula I, which, if desired, can be converted into the singly-substituted product I of the formula

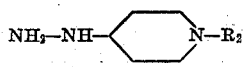

by splitting off the acyl group by saponification.

The reduction of the aforementioned hydrazones to the corresponding hydrazine derivatives can be effected with the aid of nascent or catalytically-activated hydrogen. Suitable catalysts for this purpose are the metals of the 8th group of the periodic system, platinum and nickel being preferred. The hydrogenation can be carried out at ambient or raised temperature and under atmospheric or superatmospheric pressure.

Suitable acylating agents for the purposes of the present invention are for example halides of organic carboxylic acids, such as acetic acid, propionic acid, butyric acids, benzoic acid, salicylic acid, etc. Where the goal is not an acylated hydrazine, the acyl group may be split off, for example by heating with a dilute mineral acid, such e.g. as dilute hydrochloric acid.

The new N-alkyl-piperidyl-4-hydrazines of Formula I can also be prepared by reacting the corresponding N-alkyl-4-amino-piperidine with chloramine. For this purpose, it is preferred to bring together aqueous solutions of the reactants in the presence of a small quantity of gelatine and while cooling with ice, allowing the mixture to stand for a long time at ambient or raised temperature, then acidifying, evaporating, liberating the resultant free base from the residue by the addition of alkali, and then extracting the base by means of an organic solvent. The organic extract, after evaporation, yields the desired hydrazine derivative of Formula I, and this can be purified if desired by distillation and/or by conversion into a salt of an organic or inorganic acid and recrystallization.

The new piperidyl-4-hydrazines of the present invention are bases which can be distilled under reduced pressure without decomposition. As already indicated, they form stable salts with organic acids and inorganic acids, which salts crystallize at ambient temperatures (e.g. about 20° to about 30° C.). Thus, salts may be formed with a wide variety of acids such for example as hydrohalic acids (e.g. hydrochloric acid, hydrobromic acid, etc.), phosphoric acid, sulfuric acid, acetic acid, citric acid, benzoic acid, methane sulfonic acid, tartaric acid, etc.

The said piperidyl-4-hydrazines have a wide variety of uses. Thus, for example, the hydrazines which are substituted with one piperidine ring are very reactive keto-reagents. They yield, with ketones or aldehydes, hydrazones which, due to the basic piperidine component, are capable of forming salts with acids, so that the detection of the presence of keto groups is made possible in those cases where phenylhydrazine and its substitution products yield no crystalline hydrazones.

The new compounds are all also valuable intermediates for the preparation of therapeutically useful products. Thus, upon condensation with substituted dicarboxylic acid halides they yield heterocyclic derivatives. For example the new hydrazine derivatives yield by reaction with malonyl dichloride or its derivatives 3,5-diketo-pyrazolidines which, particularly those which are mono- or di-substituted in the 4-position, are valuable analgetica and antirhumatica. Thus e.g. reaction of N-methyl-piperidyl-4-hydrazine with diethyl-malonyl chloride yields 1-(N-methyl - piperidyl-4')-3,5 - diketo - 4,4 - diethyl - pyrazolidine.

The acylated hydrazines of the present invention themselves also possess pharmacodynamic properties which are therapeutically valuable. Thus, they have a blood pressure lowering action.

The following examples set forth, by way of illustration, representative and presently-preferred embodiments of the invention. In these examples, the parts are by weight unless otherwise specified; the relation between parts by weight and parts by volume, in this connection, is the same as that between grams and milliliters. Percentages are also by weight. The temperatures are set forth in degrees centigrade.

*Example 1*

22.6 parts of N-methyl-4-piperidone are added to a solution of 27.2 parts of benzoylhydrazine in 400 parts by volume of ethanol, and the mixture is boiled under reflux for 2 hours with stirring. The reaction mixture is evaporated to dryness under reduced pressure, and the residue is recrystallized from benzene-ether, yielding the benzoylhydrazone of N-methyl-4-piperidone; melting point 146–147°.

A solution of 34.6 parts of the thus-prepared benzoylhydrazone in 275 parts by volume of glacial acetic acid is hydrogenated in the presence of 0.4 part of platinum oxide catalyst at room temperature and at atmospheric pressure. At the end of four and a half hours, the theoretical quantity of hydrogen has been taken up, whereupon the solution is separated from the catalyst by filtration and is then evaporated to dryness under reduced pressure. The residue from this evaporation is boiled under reflux for 4 hours in 250 parts by volume of aqueous hydrochloric acid of 23% strength, after which the solution is allowed to cool and then extracted with ether; the aqueous layer is then evaporated to dryness under reduced pressure. To the residue of this evaporation, there is added a solution of 27 parts of potassium hydroxide in 200 parts by volume of methanol, and the mixture is then heated on the water-bath until all oily substance is dissolved. Precipitated potassium chloride is filtered off, and the filtrate is evaporated to dryness under reduced pressure. The so-obtained residue is dissolved in boiling tetrahydrofurane, the solution filtered and the filtrate evaporated to dryness under reduced pressure, after which the obtained residue is fractionated in a high vacuum. The obtained N-methyl-piperidyl-4'-hydrazine boils at 66–70° under a pressure of 0.25–0.32 mm. Hg; it is a colorless crystalline substance.

*Example 2*

8.0 parts of methylhydrazine, dissolved in 10 parts by volume of absolute ethanol, are added dropwise to a solution of 19.2 parts of N-methyl-4-piperidone, the temperature being maintained at between 20 and 30°, if necessary with the aid of a mixture of ice and salt. The mixture is then heated to 60–65° for 40 minutes. After the addition of 25 parts of benzene, the water which formed is azeotropically distilled off with the alcohol, and the solution evaporated at 80° under reduced pressure. The obtained residue is then distilled under reduced pressure. (N-methyl-4-piperidone)-methyl-hydrazone distils over at 98–99° under a pressure of 11 mm. Hg.

10 parts of benzoyl chloride, dissolved in 25 parts by volume of chloroform, are added dropwise to a solution of 10.0 parts of (N-methyl-4-piperidone)-methyl-hydrazone in 30 parts by volume of chloroform, the temperature being maintained at a maximum of 10° by cooling with an ice-salt mixture. The solution is then allowed to stand at room temperature (about 20–30°) for 12 hours, and is then evaporated. The so-obtained resinous residue is dissolved in 20 parts by volume of water, 20 parts by volume of aqueous caustic soda solution of 10% strength are added, and the resultant solution extracted with chloroform. The chloroform solution, dried over sodium sulfate, is evaporated, leaving behind a viscous yellow oil, which crystallizes when rubbed. The product—(N-methyl-4-piperidone)-methyl-benzoyl-hydrazone—crystallizes from acetone in the form of parallelopipeds which melt at 96–102°; boiling point is 145–150°/0.1 mm. Hg.

A solution of 4.0 parts of (N-methyl-4-piperidone)-methyl-benzoylhydrazone in 70 parts by volume of glacial acetic acid is added to a slurry of 0.08 part of pre-hydrogenated platinum oxide in 10 parts by volume of glacial acetic acid, and the mixture then hydrogenated at room temperature and under atmospheric pressure, whereupon the quantity of hydrogen required for the C=N double bond will be taken up within 3 hours. The solution is separated from the catalyst by filtration and is then evaporated at 60° under reduced pressure, the residue being then dissolved in 10 parts by volume of ice water. After the addition of 15 parts by volume of aqueous caustic soda solution of 20% strength and saturation with sodium chloride, the resultant mixture is extracted with chloroform. The chloroform extract is dried over sodium sulfate and is then evaporated. The so-obtained residue yields, upon distillation in a high vacuum, ω-(N-methyl-piperidyl-4)-ω'-methyl-benzoyl-hydrazine (which boils at 145–150°/0.3 mm. Hg), and which upon recrystallization from ether-petroleum ether is obtained in the form of platelets and needles which melt at 70–76°.

However, in order to prepare the hydrazine derivative itself by splitting off the benzoyl group from the benzoyl derivative, it is not necessary to prepare the latter in the pure state, but the crude hydrogenation product obtained after the evaporation of the glacial acetic acid may be directly worked up further.

800 parts by volume of aqueous hydrochloric acid of 23% strength are added to the crude ω-(N-methyl-piperidyl-4)-ω'-methyl-benzoyl-hydrazine obtained from the hydrogenation of 55.5 parts of benzoyl-hydrazone after evaporating off the glacial acetic acid, and the mixture is boiled under reflux for 5 hours. The resultant solution, cooled to −5°, is filtered from the precipitated benzoic acid and is evaporated to dryness at 80° under a pressure of 12 mm. Hg. The residue, upon recrystallization from methanol-ether, yields ω-(N-methyl-piperidyl-4)-ω'-methyl-hydrazine dihydrochloride in the form of colorless fine needles which, after being dried over phosphorus pentoxide at 50° in a high vacuum, melt at 187–210° with evolution of hydrogen chloride. The dihydrochloride, upon being treated with methanolic potassium hydroxide solution, yields the free ω-(N-methyl-piperidyl-4)-ω'-methyl-hydrazine as a water-clear colorless liquid which boils at 60°/0.3 mm. Hg; $n_D^{22}=1.4835$.

*Example 3*

86.5 parts of isopropyl-hydrazine, dissolved in 75 parts by volume of ethanol, are added dropwise to a solution of 131.7 parts of N-methyl-4-piperidone in 75 parts by volume of ethanol, the temperature being maintained at −15° to −5° by cooling. The resultant mixture is then heated to 68–80° for 30 minutes. After the addition of 200 parts by volume of benzene, water which has formed is distilled off together with the ethanol and the benzene under reduced pressure, and the residue is fractionated under reduced pressure.

The fraction which goes over at 86° to 115° under a pressure of 12 mm. Hg is again distilled. (N-methyl-4-piperidone)-isopropyl-hydrazone, which boils at 95–103° under a pressure of 8 mm. Hg, is thus obtained; $n_D^{22}=1.4925$.

37.0 parts of benzoyl chloride, dissolved in 65 parts by volume of chloroform, are added dropwise at 10° to a solution of 44.5 parts of (N-methyl-4-piperidone)-isopropyl-hydrazone in 65 parts by volume of chloroform, the resultant solution is boiled under reflux for ¾ hour and then, after cooling the solution to 0°, ice-cold aqueous caustic soda solution of 6% strength is added. The solution is then extracted twice with chloroform, the chloroform extract washed with saturated aqueous sodium chloride solution, after which it is dried over sodium sulfate and evaporated. The so-obtained residue is fractionated in a high vacuum, whereupon (N-methyl-4-piperidone)-isopropyl-benzoyl-hydrazone passes over at 128° to 130° under a pressure of 0.003 mm. Hg.

A solution of 10.65 parts of (N-methyl-4-piperidone)-isopropyl-benzoyl-hydrazone in 65 parts by volume of glacial acetic acid is added to a slurry of 0.2 part of pre-hydrogenated platinum oxide in 10 parts by volume of glacial acetic acid, and the mixture is hydrogenated under atmospheric pressure at room temperature, the required quantity of hydrogen required for the C=N double bond being taken up within 3½ hours. The solution is filtered from the catalyst and is then evaporated at 60° under reduced pressure, and the residue—a viscous light-brown oil—is refluxed for 5 hours in 100 parts by volume of aqueous hydrochloric acid of 23% strength. The solution, cooled to −5°, is filtered from the precipitated benzoic acid and is then evaporated to dryness at 80° under a pressure of 12 mm. Hg, whereupon the residue—ω-(N-methyl-piperidyl - 4) - ω' - isopropyl - hydrazine dihydrochloride—crystallizes in the form of fine needles. The salt is readily hygroscopic, and after recrystallization from ethanol, melts at 229–233°.

Example 4

Methanolic potassium hydroxide solution of a normality of 1.5 is added dropwise and with stirring to a mixture of 25.0 parts of methyl-hydrazine sulfate and 20 parts by volume of methanol until the pH of the solution is about 10. The solution is then cooled to 0°, after which a solution of 15.0 parts of N-isopropyl-4-piperidone in 20 parts by volume of methanol is added dropwise, and the reaction mixture then kept at 50° for 3 hours. The mixture is then cooled and the solution filtered from the precipitated potassium chloride. The filtrate is concentrated, the residue dissolved in 30 parts by volume of ether and filtered. After evaporation of the solvent under reduced pressure at 40°, the residue is distilled in a high vacuum. The fraction which goes over at 63–64°/0.1 mm. Hg is (N-isopropyl-4-piperidone)-methyl-hydrazone.

9.85 parts of benzoyl chloride, dissolved in 11 parts by volume of chloroform, are added dropwise to a solution of 11.86 parts of (N-isopropyl-4-piperidone)-methyl-hydrazone, the temperature being maintained at between 0° and 10° by cooling. The reaction mixture is allowed to stand for ½ hour at room temperature, and an additional 30 parts by volume of chloroform are added. The mixture is then well cooled and 50 parts by volume of an aqueous sodium hydroxide solution at 12% strength are added, the whole thoroughly admixed, and the layers separated. The aqueous fraction is extracted twice with chloroform, after which the chloroform extracts are shaken out once with 15 parts by volume of saturated aqueous sodium chloride solution. The combined chloroform solutions are dried, filtered and the chloroform evaporated off at 40° under reduced pressure. The so-obtained residue is distilled in a high vacuum. The benzoyl-methyl-hydrazone of N-isopropyl-4-piperidone passes over at 155–158°/2·10$^{-3}$ mm. Hg as a viscous yellow oil which does not crystallize even upon long standing.

4.79 parts of the benzoylated N-isopropyl-piperidone-4-methyl-hydrazone are hydrogenated at room temperature and at a pressure of 730 mm. Hg in 50 parts by volume of glacial acetic acid in the presence of 0.1 part of prehydrogenated platinum oxide as catalyst. After 3¼ hours, the theoretically required quantity of hydrogen is taken up. The catalyst is then filtered off, the glacial acetic acid is evaporated from the filtrate at 60° under reduced pressure, and the so-obtained oily residue is saponified by boiling under reflux for five hours in 75 parts by volume of aqueous hydrochloric acid of 23% strength. The reaction mixture is cooled to 0°, the precipitated benzoic acid filtered off, and the filtrate evaporated to dryness at 80° under reduced pressure. The oily, partly crystalline residue is then recystallized from methanol-ether, ω-(N-isopropyl-piperidyl-4)-ω'-methyl-hydrazine dihydrochloride being thus obtained as colorless prisms which, after four recrystallizations from methanol-ether, melt at 247–253° with decomposition.

Example 5

8.0 parts of methyl-hydrazine, dissolved in 10 parts by volume of absolute ethanol, are added dropwise to a solution of 19.2 parts of N-methyl-4-piperidone in 10 parts by volume of absolute ethanol, the temperature being maintained at between 20° and 30°, if necessary with the aid of an ice-salt mixture. The mixture is then heated to 60–65° for 40 minutes. After the addition of 25 parts by volume of benzene, the water which has formed is distilled off azeotropically with the alcohol, and the solution is then evaporated at 80° under reduced pressure. The residue is distilled under reduced pressure. (N-methyl-4-piperidone)-methyl-hydrazone passes over at 98–99° under a pressure of 11 mm. Hg.

A solution of 65.0 parts of so-obtained (N-methyl-4-piperidone)-methyl-hydrazone in 595 parts by volume of aqueous hydrochloric acid of a normality of 0.78, in which 1.2 parts of platinum oxide are slurried, is hydrogenated under atmospheric pressure at room temperature, the quantity of hydrogen required for the C=N double bond being taken up in the course of 6½ hours. The solution is then separated from the catalyst by filtration and is evaporated at 85° under reduced pressure. The residue from this evaporation is treated in the cold with 259 parts by volume of methanolic KOH of a normality of 1.78, and the potassium chloride which precipitates is filtered off. The filtrate is evaporated at 40° under reduced pressure and the residue is fractionated under a pressure of 11 mm. Hg. The fraction passing over under this pressure at 98–110°—a colorless basic oil—is ω-(N-methyl-piperidyl-4)-ω'-methyl-hydrazine; melting point = 60°/0.3 mm. Hg, $n_D^{22}$=1.4835.

Example 6

79.2 parts of isopropyl-hydrazine-hydrate, dissolved in 40 parts by volume of absolute ethanol, are added dropwise to a solution of 110.28 parts of N-isopropyl-4-piperidone in 200 parts by volume of absolute ethanol, the temperature being maintained at between 20° and 30° by cooling. The mixture is then heated to 60–65° for 40 minutes, after which the solution is evaporated at 80° under reduced pressure. The so-obtained residue is distilled under reduced pressure. (N-isopropyl-4-piperidone)-isopropyl-hydrazone passes over at 86–88° under a pressure of 1 mm. Hg.

108 parts of benzoyl chloride, dissolved in 220 parts by volume of chloroform, are added dropwise to a solution of 150.3 parts of (N-isopropyl-4-piperidone)-isopropyl-hydrazone in 450 parts by volume of chloroform, the temperature being kept at 15° by cooling with an ice-salt mixture. The solution is boiled under reflux for ½ hour, and is then diluted with 300 parts by volume of chloroform. After cooling with ice, it is shaken out with 400 parts by volume of ice-cold aqueous caustic soda solution of 10% strength. The caustic soda extract is extracted twice each time with 300 parts by volume of chloroform, the chloroform extracts washed with saturated aqueous sodium chloride solution, the extracts combined and then, after being dried over sodium sulfate, evaporated. The remaining residue distills as a viscous yellow-colored oil at 145–155°/0.002 mm. Hg.

A solution of 205.03 parts of the so-obtained (N-isopropyl-4-piperidone)-isopropyl-benzoyl-hydrazone in 1000 parts by volume of glacial acetic acid is added to a slurry of 2.70 parts of pre-hydrogenated platinum oxide in 100 parts by volume of glacial acetic acid, and the mixture is then hydrogenated under atmospheric pressure at room temperature, the quantity of hydrogen necessary for the C=N double bond being taken up within 9 hours. The resultant solution is separated from the catalyst by filtration, after which it is evaporated at 60° under reduced pressure. The resultant viscous yellow-colored residue is dissolved in 1200 parts by volume of aqueous hydrochloric acid of 23% strength and the solution is boiled under reflux for 8 hours. After cooling and filtering off the benzoic acid which crystallizes out, the solution is evaporated at 80° under reduced pressure, the so-obtained residue solidifying in crystalline form; it is ω-(N-isopropyl-piperidyl-4)-ω'-isopropyl-hydrazine dihydrochloride which after recrystallization from methanol is obtained in the form of colorless needles which melt at 258–262° (decomposition).

Upon treatment with methanolic KOH, the dihydrochloride yields the free ω-(N-isopropyl-piperidyl-4)-ω'-isopropyl-hydrazine as a water-clear colorless liquid which boils at 80°/0.25 mm. Hg; $n_D^{25} = 1.4711$.

*Example 7*

800 parts by volume of ethanol, in which 35.5 parts of sodium have been dissolved, are added dropwise at 20° to a solution of 107.0 parts of ethyl-hydrazine dihydrochloride in 800 parts by volume of ethanol, and the mixture is boiled under reflux for ½ hour. The mixture is then cooled to 10°, after which a solution of 91.5 parts of N-methyl-4-piperidone in 90 parts by volume of ethanol is stirred thereinto dropwise. The mixture is then boiled under reflux for ½ hour, cooled to 0°, separated from precipitated sodium chloride by filtration, and the filtrate evaporated at 60° under reduced pressure. The so-obtained residue is distilled in vacuo, whereupon (N-methyl-4-piperidone)-ethyl-hydrazone passes over at 58–61° at a pressure of 0.1 mm. Hg.

35.85 parts of benzoyl chloride, dissolved in 35 parts by volume of chloroform, are added dropwise to a solution of 39.57 parts of (N-methyl-4-piperidone)-ethyl-hydrazine in 300 parts by volume of chloroform, the temperature being maintained at 10–20° by cooling with ice-salt mixture. The yellow-colored reaction solution is boiled under reflux for ½ hour and then, after having been cooled, is extracted twice, each time with 100 parts by volume of aqueous caustic soda solution of 10% strength. The combined caustic soda extracts are extracted twice with chloroform, using 100 parts by volume each time, after which the combined chloroform extracts are dried over sodium sulfate and then evaporated. The remaining residue distils as a viscous oil at a bath temperature of 135–136°/0.2 mm. Hg; it is (N-methyl-4-piperidone)-ethyl-benzoyl-hydrazone.

A solution of 72.3 parts of (N-methyl-4-piperidone)-ethyl-benzoyl-hydrazone in 500 parts by volume of glacial acetic acid is added to a slurry of 0.8 part of pre-hydrogenated platinum oxide in 100 parts by volume of glacial acetic acid, and the mixture is hydrogenated under atmospheric pressure at room temperature, the quantity of hydrogen required for the C=N double bond being taken up in the course of 6 hours. The catalyst is separated by filtration and the catalyst-free solution is evaporated at 60° under reduced pressure, whereupon the viscous residue is dissolved in 600 parts by volume of aqueous hydrochloric acid of 23% strength and the obtained solution boiled under reflux for 8 hours. After cooling and filtering off the precipitated benzoic acid, the solution is evaporated at 80° under reduced pressure, and the so-obtained residue—ω-(N-methyl-piperidyl-4)-ω'-ethyl-hydrazine dihydrochloride—solidifies in crystalline form and yields, after recrystallization from ethanol-methanol, colorless needles which melt at 231–233° (with decomposition).

The dihydrochloride, upon treatment with methanolic KOH, yields the free ω-(N-methyl-piperidyl-4)-ω'-ethyl-hydrazine as a water-clear colorless liquid.

*Example 8*

31.04 parts of N-n-butyl-4-piperidone are added to a solution of 14.8 parts of acetyl-hydrazine in 200 parts by volume of ethanol, and the mixture is boiled under reflux for 4 hours. Upon evaporating the solvent under reduced pressure, there remains behind a granular crystalline residue which melts at 76–78°, and is the (N-n-butyl-4-piperidone)-acetylhydrazone.

A solution of 39.2 parts of the said (N-n-butyl-4-piperidone)-acetyl-hydrazone in 300 parts by volume of glacial acetic acid is hydrogenated at room temperature and at atmospheric pressure in the presence of 0.4 part of platinum oxide, the quantity of hydrogen necessary for the C=N double bond being taken up within 4 hours. The catalyst is filtered from the solution and the catalyst-free solution is evaporated at 60° under reduced pressure. The viscous residue is dissolved in 100 parts by volume of aqueous hydrochloric acid, and the resultant solution is boiled under reflux for 8 hours. The solution is then evaporated at 80° under reduced pressure. To the so-obtained residue, there is added the calculated quantity of methanolic KOH. Precipitated potassium chloride is filtered off and the methanol is evaporated under reduced pressure. The residue is then distilled under reduced pressure whereupon (N-n-butyl-piperidyl-4)-hydrazine distils over at 81° under a pressure of 0.3 mm. Hg. The distillate crystallizes; melting point = 30–35°.

*Example 9*

15.5 parts of N-n-butyl-4-piperidone are added to a solution of 13.6 parts of benzoyl-hydrazine in 100 parts by volume of ethanol, and the mixture is refluxed for 4 hours. Upon evaporation of the solvent under reduced pressure, there remains a viscous yellow-colored residue which crystallizes upon being rubbed; it is the (N-n-butyl-4-piperidone)-benzoylhydrazone.

A solution of 17.0 parts of the said (N-n-butyl-4-piperidone)-benzoyl-hydrazone in 170 parts by volume of glacial acetic acid is hydrogenated in the presence of 0.2 part of platinum oxide at room temperature and at atmospheric pressure, the quantity of hydrogen necessary for the C=N double bond being taken up in the course of 3 hours. The catalyst is filtered off and the catalyst-free solution is evaporated at 60° under reduced pressure. The so-obtained viscous residue is dissolved in 200 parts by volume of aqueous hydrochloric acid of 23% strength, and the resultant solution is boiled under reflux for 12 hours. After cooling and filtering off the precipitated benzoic acid, the filtrate is evaporated at 80° under reduced pressure. The calculated quantity of methanolic KOH is then added to the residue. Precipitated potassium chloride is filtered off and methanol is evaporated off under reduced pressure. The residue is distilled in vacuo, whereby (N-n-butyl-piperidyl-4)-hydrazine—identical with the product of the preceding example—is obtained.

*Example 10*

24.94 parts by weight of N-isopropyl-4-piperidone are added to a solution of 24.05 parts by weight of benzoyl-hydrazine in 150 parts by volume of ethanol, and the mixture boiled under reflux for 4 hours. Upon evaporation of the solvent under reduced pressure at 60°, (N-isopropyl-4-piperidone)-benzoyl-hydrazone remains as a crystalline residue which, upon crystallization from benzene, yields fine felted needles which melt at 107–108°.

A solution of 47.5 parts of (N-isopropyl-4-piperidone)-benzoyl-hydrazone in 280 parts by volume of glacial acetic acid is hydrogenated in the presence of 0.75 part of platinum oxide at room temperature and at atmospheric pressure, the quantity of hydrogen necessary for the C=N double bond being taken up in the course of 110 minutes. The catalyst is removed by filtration and the catalyst-free solution is evaporated at 70° under reduced pressure. The so-obtained viscous residue is dissolved in 500 parts by volume of aqueous hydrochloric acid of 23% strength and the resultant solution is boiled under reflux for 11 hours. After cooling and filtering off precipitated benzoic acid, the solution is evaporated at 80° under reduced pressure and the so-obtained brown-colored residue is treated with the calculated quantity of methanolic KOH of a normality of 1.76. Precipitated potassium chloride is filtered off and the methanol is evaporated off under reduced pressure. The residue is distilled in vacuo, whereupon (N-isopropyl-piperidyl-4)-hydrazine boils at 75–77° under a pressure of 0.7 mm. Hg. The distillate is a colorless viscous oil, which solidifies upon cooling. Its melting point is only slightly above room temperature.

*Example 11*

76.2 parts of N-methyl-4-piperidone are added dropwise to a solution of 50 parts of acetic acid hydrazide in 60 parts by volume of ethanol, the temperature of the mixture being kept at a maximum of 40°. The mixture is then boiled under reflux for 2 hours, after which it is evaporated to dryness under reduced pressure. Recrystallization from methylene chloride-petroleum ether yields the acetylhydrazone of N-methyl-4-piperidone in the form of crystals which melt at 108–109°.

7.5 parts of N-methyl-4-piperidone-acetyl-hydrazone are dissolved in 100 parts by volume of ethanol, and the solution is hydrogenated in the presence of 1.5 parts of Raney nickel at 20° and under atmospheric pressure, the calculated quantity of hydrogen being taken up in the course of 17½ hours. The catalyst is then filtered off and the catalyst-free solution is evaporated under reduced pressure, after which the obtained residue is distilled in vacuo, whereupon ω-acetyl-ω'-(N-methyl-piperidyl-4)-hydrazine distils over at a bath temperature of 120–130° under a pressure of 0.01 mm. Hg as a colorless viscous oil which solidifies in crystalline form upon cooling; melting point 101–103°.

The hydrogenation in the presence of Raney nickel can also be carried out at raised pressure and room temperature or at elevated temperature:

A solution of 10 parts of acetyl-hydrazone in 50 parts by volume of ethanol is hydrogenated in the presence of 2 parts of Raney nickel at (*a*) 12–13° under a pressure of 50 atmospheres or (*b*) at 65° under a pressure of 90 atmospheres. In both cases, the desired hydrazine derivative is isolated as in the preceding paragraph.

10 parts of ω-acetyl-ω'-(N-methyl-piperidyl-4)-hydrazine together with 100 parts by volume of aqueous hydrochloric acid of 23% strength are boiled under reflux for 8 hours, after which the aqueous solution is evaporated to dryness under reduced pressure. The resultant residue is treated with the calculated quantity of 2-normal methanolic potassium hydroxide solution. Precipitated potassium chloride is then filtered off, and the filtrate freed of methanol by evaporation of the latter under reduced pressure. The so-obtained residue is distilled in high vacuum, whereupon (N-methyl-piperidyl-4)-hydrazine passes over at 66–70° under a pressure of 0.25–0.32 mm. Hg. The distillate is a colorless substance which solidifies in crystalline form.

*Example 12*

A solution of 13.5 parts of anhydrous hydrazine in 50 parts by volume of ethanol is added to a solution of 25 parts of N-methyl-4-bromo-piperidine in 30 parts by volume of absolute ethanol at room temperature and the mixture is boiled under reflux for 4 hours. Thereupon, the solvent and excess hydrazine are distilled off at 75° under reduced pressure. The viscous residue is extracted four times, each time with 75 parts by volume of ether, and the obtained solidified white reaction product is then suspended in 25 parts by volume of methanol. This suspension is treated with the calculated quantity of methanolic potassium hydroxide solution, precipitated potassium bromide is filtered off, and the filtrate is evaporated to dryness at 75° under reduced pressure. The so-obtained residue is extracted with 100 parts by volume of boiling tetrahydrofurane, and this extract is evaporated to dryness. The resultant residue, upon distillation under a pressure of 0.3 mm. Hg at a bath temperature of 75–80°, yields (N-methyl-piperidyl-4)-hydrazine as a colorless viscous oil which, when cold, solidifies in crystalline form.

*Example 13*

11.3 parts of N-methyl-4-piperidone, dissolved in 25 parts by volume of ethanol, are added dropwise to a suspension of 15.2 parts of salicylic acid hydrazide in 80 parts by volume of absolute ethanol, and the resultant mixture is boiled under reflux for 2 hours. Upon evaporating off the solvent at 70° under reduced pressure, crude (N-methyl-4-piperidone)-salicoyl-hydrazone is obtained as a semi-crystalline product.

A solution of 10 parts of the crude (N-methyl-4-piperidone)-salicoyl-hydrazone in 120 parts by volume of glacial acetic acid is hydrogenated in the presence of 0.5 part of platinum oxide at room temperature and at atmospheric pressure, the quantity of hydrogen necessary for the C=N double bond being taken up in the course of an hour and a half. The catalyst is then filtered off and the catalyst-free solution is evaporated to dryness at 75° under reduced pressure. The resultant viscous residue is dissolved in 100 parts by volume of chloroform and, after cooling the solution to 0°, an excess of saturated aqueous potassium carbonate solution is added. After three extractions of the aqueous alkaline layer, each extraction with 100 parts by volume of chloroform, the combined extracts are dried over sodium sulfate, and the solvent evaporated off at 50° under reduced pressure. The so-obtained semi-crystalline residue is dissolved in 50 parts by volume of methylene chloride, and gaseous hydrogen chloride is passed in until a reaction which is acid to congo is achieved. The solvent is then evaporated off at 50° under reduced pressure, and the crystalline residue—ω-(N-methyl-piperidyl-4)-ω'-salicoyl-hydrazine dihydrochloride—is purified by three-fold recrystallization from ethanol; melting point =215–220° (decomposition). Upon heating the dihydrochloride to boiling under reflux with aqueous hydrochloric acid of 23% strength, the salicoyl group is split off, and N-methyl-piperidyl-4-hydrazine is obtained as a colorless crystalline substance which boils at 66–70° under a pressure of 0.25–0.32 mm. Hg.

*Example 14*

76.2 parts of N-methyl-4-piperidone are added dropwise to a solution of 50 parts of acetic acid hydrazide in 60 parts by volume of ethanol, the temperature of the mixture being maintained at a maximum of 40°. The mixture is then boiled under reflux for 2 hours, after which it is evaporated to dryness under reduced pressure. Recrystallization of the residue from methylene chloride-petroleum ether yields the acetyl-hydrazone of N-methyl-4-piperidone in the form of crystals which melt at 108–109°.

7.5 parts of the so-obtained N-methyl-4-piperidone-acetyl-hydrazone are dissolved in 100 parts by volume of ethanol, and the solution hydrogenated in the presence of 1.5 parts of Raney nickel at 20° and under atmospheric pressure, the calculated quantity of hydrogen being taken up within 17½ hours. The catalyst is filtered off and the catalyst-free solution is evaporated under reduced pressure. The resultant residue is distilled in a high vacuum whereupon ω-acetyl-ω'-(N-methyl-piperidyl-4)-hydrazine distils over at a bath temperature of 120–130° under a pressure of 0.01 mm. Hg as a colorless viscous oil which, upon cooling, solidifies in crystalline form; melting point 101–103°.

Alternatively the hydrogenation may be carried out as follows: a solution of 10 parts of acetyl-hydrazone in 50 parts by volume of ethanol is hydrogenated in the presence of 2 parts of Raney nickel (*a*) at 12–13° under a pressure of 50 atmospheres or (*b*) at 65° under a pressure of 90 atmospheres. In both cases the desired hydrazine derivative is isolated as in the preceding paragraph.

10 parts of ω-acetyl-ω'-(N-methyl-piperidyl-4)-hydrazine and 100 parts by volume of aqueous hydrochloric acid of 23% strength are boiled under reflux for 8 hours, after which the aqueous solution is evaporated to dryness under reduced pressure. The residue is treated with the calculated quantity of 2-normal methanolic KOH solution. Precipitated potassium chloride is then filtered off, and the filtrate is freed from methanol by evaporation of the latter under reduced pressure. The so-obtained residue is distilled in a high vacuum whereupon (N-methyl-piperidyl-4)-hydrazine distils over at 66–70° under a pressure of 0.25–0.32 mm. Hg as a colorless substance which solidifies in crystalline form upon cooling.

*Example 15*

A solution of 11.3 parts of N-methyl-piperidone-4 in 50 parts by volume of ethanol is added dropwise to a suspension of 13.7 parts of isonicotinic acid hydrazide in 200 parts by volume of ethanol. The reaction mixture boiled under reflux for four hours, after which the ethanol is evaporated off under reduced pressure. The obtained crude N-methyl-piperidone-4-isonicotinoyl-hydrazone is recrystallized three times from a mixture of ethanol and ether; melting point 174–177°.

8.7 parts of the so-obtained pure hydrazone, in solution in 250 parts by volume of ethanol, are hydrogenated in the presence of 0.3 part of platinum oxide at 5 atmospheres pressure and at a temperature of 50°. The calculated quantity of hydrogen is absorbed at the end of 45 minutes. The catalyst is filtered off and the catalyst-free filtrate is evaporated to dryness under reduced pressure. The viscous residue which remains behind is dissolved in 75 parts by volume of methylene chloride, after which dry hydrogen chloride is passed into the solution until a congo-acid reaction is achieved. The solvent is then evaporated off under reduced pressure, and the remaining residue is recrystallized from ethanol (95%). The so-obtained pure ω-(N-methyl-piperidyl-4')-ω'-isonicotinoyl-hydrazine trihydrochloride melts at 200–208°, with decomposition. Upon boiling the latter under reflux with aqueous hydrochloric acid of 23% strength, the isonicotinoyl group is split off, and there results N-methyl-piperidyl-4-hydrazine as a colorless crystalline substance which boils at 66–70° under a pressure of 0.25–0.32 mm. Hg.

*Example 16*

To 47 parts by volume of 0.25 molar aqueous chloramine solution, there are added, while cooling with ice, a solution of 8.0 parts of N-methyl-4-amino-piperidine and 0.06 part of gelatine in 20 parts by volume of water. The temperature of the reaction mixture is then allowed to rise to room temperature in the course of an hour, after which completion of the reaction is achieved by heating for 30 minutes on the steam-bath. Concentrated hydrochloric acid is then added to the solution until a congo-acid is attained, after which the solution is evaporated to dryness under reduced pressure. The residue is then dissolved in 30 parts by volume of water, the solution saturated with solid potassium carbonate and then extracted six times with, each time, 50 parts by volume of methylene chloride. The solvent is then evaporated off, and the resultant residue is fractionally distilled in vacuo, whereby N-methyl-piperidyl-4-hydrazine which distils at 66–70°/0.3 mm. Hg is isolated.

Having thus disclosed the invention, what is claimed is:

1. A member selected from the group consisting of piperidyl-4-hydrazines which correspond to the formula

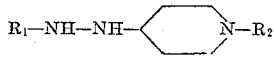

and therapeutically useful salts thereof with acids, wherein $R_1$ stands for a member selected from the group consisting of hydrogen, alkyl with 1 to 4 carbon atoms, acetyl, propionyl, butyryl, valeryl, caproyl, benzoyl and salicoyl, and $R_2$ stands for alkyl with 1 to 4 carbon atoms.

2. (N-alkyl-piperidyl-4')-hydrazine, the alkyl containing 1 to 4 carbon atoms.

3. ω-(N-alkyl-piperidyl-4)-ω'-alkyl-hydrazine, each alkyl containing 1 to 4 carbon atoms.

4. (N-methyl-piperidyl-4')-hydrazine.

5. ω-(N-methyl-piperidyl-4)-ω'-methyl-hydrazine.

6. ω - (N - methyl - piperidyl - 4) - ω' - isopropyl-hydrazine.

7. (N-n-butyl-piperidyl-4)-hydrazine.

8. ω - (N - methyl - piperidyl - 4) - ω' - acetyl - hydrazine.

9. A method for the preparation of a piperidyl-4-hydrazine which comprises admixing an N-alkyl-4-piperidone which corresponds to the formula

wherein $R_2$ stands for an alkyl group with 1 to 4 carbon atoms, with an alkylhydrazine of the formula

wherein $R_1$ is an alkyl group with 1 to 4 carbon atoms, while maintaining the temperature not substantially in excess of about 30° C., then heating the resultant mixture to effect condensation whereby the corresponding N-alkyl-piperidone-4-alkyl-hydrazone is obtained, and subjecting the latter to hydrogenation whereby the corresponding ω-(N-alkyl-piperidyl-4)-ω'-alkyl-hydrazine is obtained.

10. A method for the preparation of a piperidyl-4-hydrazine which comprises heating a mixture of an N-alkyl-4-piperidone which corresponds to the formula

wherein $R_2$ stands for an alkyl group with 1 to 4 carbon atoms, with an alkyl hydrazine of the formula

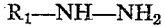

wherein $R_1$ is an alkyl group with 1 to 4 carbon atoms, to effect condensation whereby the corresponding N-alkyl-piperidone-4-alkyl-hydrazone is obtained, acylating the said hydrazone by boiling with an acyl halide, subjecting the so-obtained acylated product to hydrogenation, and finally splitting off the acyl group from the reduced product by the action of a saponifying agent.

No references cited.